(12) United States Patent
Zhang et al.

(10) Patent No.: US 12,177,645 B2
(45) Date of Patent: Dec. 24, 2024

(54) SOUND-GENERATING DEVICE, DISPLAY DEVICE, SOUND-GENERATING CONTROLLING METHOD, AND SOUND-GENERATING CONTROLLING DEVICE

(71) Applicants: Beijing BOE Optoelectronics Technology Co., Ltd., Beijing (CN); BOE Technology Group Co., Ltd., Beijing (CN)

(72) Inventors: Shuo Zhang, Beijing (CN); Tiankuo Shi, Beijing (CN); Xiaomang Zhang, Beijing (CN); Yanhui Xi, Beijing (CN); Zhihua Ji, Beijing (CN); Yan Sun, Beijing (CN); Chenxi Zhao, Beijing (CN); Xiangjun Peng, Beijing (CN); Yifan Hou, Beijing (CN); Lianghao Zhang, Beijing (CN); Li Tian, Beijing (CN); Jing Liu, Beijing (CN); Wei Sun, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 78 days.

(21) Appl. No.: 17/800,011

(22) PCT Filed: May 21, 2021

(86) PCT No.: PCT/CN2021/095015
§ 371 (c)(1),
(2) Date: Aug. 16, 2022

(87) PCT Pub. No.: WO2021/249157
PCT Pub. Date: Dec. 16, 2021

(65) Prior Publication Data
US 2023/0088530 A1 Mar. 23, 2023

(30) Foreign Application Priority Data

Jun. 8, 2020 (CN) .......................... 202010511398.0

(51) Int. Cl.
*H04S 7/00* (2006.01)
*G02B 30/00* (2020.01)
(Continued)

(52) U.S. Cl.
CPC .............. *H04S 7/302* (2013.01); *G06T 7/593* (2017.01); *G06T 7/73* (2017.01); *H04N 13/302* (2018.05);
(Continued)

(58) Field of Classification Search
None
See application file for complete search history.

(56) References Cited

U.S. PATENT DOCUMENTS

| 8,638,959 B1 | 1/2014 | Hall |
| 9,008,335 B2 * | 4/2015 | Choi ...................... H04R 1/345 381/345 |

(Continued)

FOREIGN PATENT DOCUMENTS

| CA | 3011644 A1 | 7/2017 |
| CN | 101129091 A | 2/2008 |

(Continued)

OTHER PUBLICATIONS

Zhang Yan. "Dolby Panorama—Inject better immersive experience into live TV." Advanced Television Engineering. Jan. 31, 2018.
(Continued)

*Primary Examiner* — Qin Zhu
(74) *Attorney, Agent, or Firm* — IPro, PLLC

(57) ABSTRACT

A sound-generating device, a display device, a sound-generating controlling method, and a sound-generating con-
(Continued)

trolling device are provided. The sound-generating device includes: a reflection plate which includes a first sound wave reflection face arranged towards a first direction; a plurality of main loudspeakers, the plurality of main loudspeakers are distributed in an array in a preset three-dimensional space, and the preset three-dimensional space is located at one side of the first sound wave reflection face towards a first direction; the plurality of main loudspeakers include first main loudspeakers with a sound-generating direction towards the first direction, and second main loudspeakers with a sound-generating direction towards a second direction, the second direction is an opposite direction of the first direction; and the sound waves emitted by the second main loudspeakers are transmitted to the first sound wave reflection face and can be reflected by the first sound wave reflection face.

17 Claims, 10 Drawing Sheets

(51) Int. Cl.
| | |
|---|---|
| *G06T 7/593* | (2017.01) |
| *G06T 7/73* | (2017.01) |
| *G09F 9/00* | (2006.01) |
| *G09F 27/00* | (2006.01) |
| *H04N 5/64* | (2006.01) |
| *H04N 13/302* | (2018.01) |
| *H04R 1/02* | (2006.01) |
| *H04R 1/34* | (2006.01) |
| *H04R 1/40* | (2006.01) |
| *H04R 3/12* | (2006.01) |
| *H04R 5/02* | (2006.01) |
| *H04R 5/04* | (2006.01) |

(52) U.S. Cl.
CPC ............. *H04R 1/028* (2013.01); *H04R 1/345* (2013.01); *H04R 3/12* (2013.01); *H04R 5/02* (2013.01); *H04R 2201/401* (2013.01); *H04R 2499/15* (2013.01); *H04S 2400/11* (2013.01)

(56) References Cited

U.S. PATENT DOCUMENTS

| | | | |
|---|---|---|---|
| 10,149,083 B1 | 12/2018 | Pittman et al. | |
| 2009/0060237 A1 | 3/2009 | Konagai et al. | |
| 2012/0039476 A1 | 2/2012 | Cha | |
| 2013/0034251 A1* | 2/2013 | Fincham | H04R 3/12 381/160 |
| 2013/0236031 A1 | 9/2013 | Risberg | |
| 2014/0185815 A1* | 7/2014 | Roblek | G06F 16/683 381/56 |
| 2014/0314249 A1* | 10/2014 | Fincham | H04R 1/403 381/89 |
| 2015/0208190 A1 | 7/2015 | Hooks et al. | |
| 2016/0105740 A1 | 4/2016 | Suzuki et al. | |
| 2016/0255434 A1 | 9/2016 | Yamamoto et al. | |
| 2017/0272866 A1* | 9/2017 | Griffiths | H04R 9/063 |
| 2017/0295418 A1 | 10/2017 | Curtinsmith et al. | |
| 2018/0020312 A1* | 1/2018 | Visser | H04S 7/306 |
| 2018/0192222 A1* | 7/2018 | De Bruijn | H04N 13/398 |
| 2018/0367939 A1 | 12/2018 | Fischer et al. | |
| 2020/0053440 A1 | 2/2020 | Tsurumoto et al. | |
| 2020/0351589 A1 | 11/2020 | Zhao et al. | |
| 2020/0396559 A1 | 12/2020 | Crockett et al. | |

FOREIGN PATENT DOCUMENTS

| | | |
|---|---|---|
| CN | 101536541 A | 9/2009 |
| CN | 102845077 A | 12/2012 |
| CN | 103125126 A | 5/2013 |
| CN | 105191349 A | 12/2015 |
| CN | 105933830 A | 9/2016 |
| CN | 106416293 A | 2/2017 |
| CN | 206136257 U | 4/2017 |
| CN | 107113492 A | 8/2017 |
| CN | 107493542 A | 12/2017 |
| CN | 108370482 A | 8/2018 |
| CN | 108780228 A | 11/2018 |
| CN | 109151661 A | 1/2019 |
| CN | 109168125 A | 1/2019 |
| CN | 210609663 U | 5/2020 |
| CN | 111641898 A | 9/2020 |
| EP | 2429215 A2 | 3/2012 |
| EP | 3319335 A1 | 5/2018 |
| EP | 3493559 A1 | 6/2019 |
| JP | 3982394 B2 | 9/2007 |
| WO | 2016186471 A1 | 11/2016 |
| WO | 2018110160 A1 | 6/2018 |

OTHER PUBLICATIONS

Zhu Wei. "Introduction to Sound Reinforcement Technology." pp. 53-73. Communication University of China Press. Sep. 1, 2010.
CN 202010511398.0 first office action.
PCT/CN2021/095015 international search report and written opinion.

* cited by examiner

SOUND-GENERATING DEVICE, DISPLAY DEVICE, SOUND-GENERATING CONTROLLING METHOD, AND SOUND-GENERATING CONTROLLING DEVICE

CROSS-REFERENCE TO RELATED APPLICATION

This application is the U.S. national phase of PCT Application PCT/CN2021/095015 filed on May 21, 2021, which claims priority to Chinese Patent Application No. 202010511398.0 filed in China on Jun. 8, 2020, the entire contents of which are incorporated herein by reference.

TECHNICAL FIELD

The application relates to the technical field of display, and particularly relates to a sound-generating device, a display device, a sound-generating controlling method, and a sound-generating controlling device.

BACKGROUND

In recent years, a 3D video technology has developed rapidly and become a new direction of home entertainment, especially the application of naked-eye 3D televisions. As an epochal technology, by using a naked-eye 3D technology, the perception of audiences can be improved without wearing glasses.

SUMMARY

Embodiments of the present disclosure provide a sound-generating device, which includes:
 a reflection plate, which includes a first sound wave reflection face arranged towards a first direction;
 a plurality of main loudspeakers, the plurality of main loudspeakers are distributed in an array in a preset three-dimensional space, and the preset three-dimensional space is located at one side of the first sound wave reflection face towards the first direction; and
 the plurality of the main loudspeakers include first main loudspeakers with a direction of sound production towards the first direction, and second main loudspeakers with a direction of sound production towards a second direction, where the second direction is opposite to the first direction; and the sound waves emitted by the second main loudspeakers are transmitted to the first sound wave reflection face and can be reflected by the first sound wave reflection face.

Optionally, the sound-generating device, where the plurality of main loudspeakers are arranged in the plurality of array layers, the plurality of array layers are arranged in sequence along the first direction, the center of the sound-generating surface of the main loudspeakers arranged in an array in a plane parallel to the first sound wave reflection face.

Optionally, the sound-generating device, where the plurality of the array layers include a first array layer and a second array layer arranged alternately, where the plurality of the main loudspeakers in the first array layer are all first main loudspeakers and the plurality of the main loudspeakers in the second array layer are all second main loudspeakers.

Optionally, the sound-generating device, where each of the array layers includes the plurality of first main loudspeakers and the plurality of second main loudspeakers respectively, and the plurality of the first main loudspeakers and the plurality of the second main loudspeakers are spaced apart and uniformly distributed from each other in the array layer.

Optionally, the sound-generating device, where an orthographic projection of the main loudspeaker of one of the two adjacent array layers in the plane of the other array layer does not overlap the main loudspeaker of the other array layer.

Optionally, the sound-generating device includes a shell arranged around the preset three-dimensional space, a sound-generating outlet is provided on a first side face of the shell, and a second side face of the shell opposite to the first side face is the reflection plate,
 where a portion of the first side face excluding the sound-generating outlet and other side faces of the shell are respectively provided with a second sound wave reflection face; and the other side is connected to the first side and the second side.

The embodiment of the present disclosure further provides the display device, which includes the sound-generating device as described in any above-mentioned embodiment.

Optionally, the display device, where the display device further includes a display component, the sound-generating device is arranged on a surface of the display component facing away from the display screen, or arranged inside the display component.

Optionally, the display device further includes a plurality of sub-loudspeakers surrounding the display screen are provided on the display component, and the sound-generating directions of the sub-loudspeakers are arranged facing away from the display screen.

The embodiment of the present disclosure also provides a sound-generating controlling method, where the method is applied to any of the above-mentioned display devices, and the method includes the following steps:
 acquiring video data and audio data of audio and video data to be output;
 performing feature classification on the audio data corresponding to a target output image in the video data, and determining an audio object in the audio data;
 performing sound-generating object recognition according to the target output image, and determining a sound-generating object corresponding to the audio object;
 determining sound-generating position coordinates of the sound-generating object when the target output image presents a 3D display on the display device; and
 sending audio control information to the plurality of the main loudspeakers according to the sound-generating position coordinates, so that the positions of sound sources generated by the plurality of the main loudspeakers are located at the sound-generating position coordinates.

Optionally, the step of determining sound-generating position coordinates of the sound-generating object when the target output image is 3D displayed on the display device includes:
 determining a depth image of the target output image when the target output image is 3D displayed on the display device;
 determining plane coordinates of the sound-generating object according to the target output image, and determining depth coordinates of the sound-generating object according to the depth image; and determining the sound-generating position coordinates according to the plane coordinates and the depth coordinates.

Optionally, the target output image includes a first view image and a second view image, where the first view image and the second view image are images of different views of the same sound-generating object, and the step of determining a depth image of the target output image when the target output image is 3D displayed on the display device includes:

determining a pixel point corresponding to each pixel point in the first view image on the second view image in the target output image, and calculating and obtaining parallax of each pixel point in the first view image;

calculating and obtaining the depth value of each pixel point in the first view image according to the parallax of each pixel point in the first view image and following formulas, so as to obtain the depth image of the first view image; and $$\frac{T-(x_1-x_r)}{Z-f} = \frac{T}{Z} \Rightarrow \frac{fT}{x_1-x_r} = \frac{fT}{d} = Z$$

presenting the depth image of the first view image as the depth image when the target output image is 3D displayed on the display device, where, in the above formula, Z is the depth value of any pixel point in the first view image, T represents a distance between optical axis centers $O_l$ and $O_r$ of a first camera and a second camera photographing the first view image and the second view image, $x_l$ is a horizontal axis of any pixel point in the first view image on a projection plane of the first camera, $x_r$ is a horizontal axis of a corresponding pixel point in the second view image on a projection plane of the second camera, f is a focal length of the first camera and the second camera, and $d=x_l-x_r$ is the parallax of any pixel point in the first view image.

Optionally, determining the position coordinates of the sound-generating object according to the plane coordinates and the depth coordinates, including:

determining 3D image coordinates of the sound-generating object according to the plane coordinates and the depth coordinates;

converting the coordinates of the 3D image into a coordinate system determined according to the display component, and determining the sound-generating position coordinates.

Optionally, performing feature classification on the audio data corresponding to the target output image in the video data, and determining an audio object in the audio data, including:

analyzing the audio data to extract audio features in the audio data;

integrating the extracted audio features to establish a feature vector; and classifying and recognizing the integrated feature vector, and determining different audio objects in the audio data.

Optionally, the step of determining a sound-generating object corresponding to the audio object includes:

matching each frame of output images of the audio data and the video data according to time-domain information of the sound-generating action information of the sound-generating object in the audio data and according to sound-generating action information of the sound-generating object in the target output image, and determining the sound-generating object corresponding to each audio object in the audio data in the target output image.

The embodiment of the present application further provides the sound-generating controlling device, where the sound-generating controlling device which is applied on any of the above-mentioned display device includes:

a data acquisition circuit, which is used for acquiring the video data and the audio data of audio and video data to be output;

an audio classification circuit, which is used for performing the feature classification on the audio data corresponding to the target output image in the video data and determining the audio object in the audio data;

a recognition circuit, which is used for performing the sound-generating object recognition according to the target output image, and determining the sound-generating object corresponding to the audio object;

a coordinate determining circuit, which is used for determining the sound-generating position coordinates of the sound-generating object when the target output image is 3D displayed on the display device;

an audio output circuit, which is used for sending audio control information to the plurality of the main loudspeakers according to the sound-generating position coordinates, so that the positions of sound sources generated by the plurality of the main loudspeakers are located at the sound-generating position coordinates.

The embodiments of the present disclosure also provide the sound-generating controlling device, which includes a processor, a memory, and programs or commands stored on the memory and executable on the processor, when executed by the processor, the programs or the commands can be used to realize any of the above-mentioned sound-generating controlling methods.

The embodiments of the present disclosure also provide a computer-readable storage medium which stores the programs or commands, when executed by the processor, the programs or the commands can be used to realize any of the above-mentioned sound-generating controlling methods.

DETAILED DESCRIPTION

In order to make the technical problems, technical solutions, and advantages of the present disclosure clearer, a detailed description will be given below with reference to the accompanying drawings and specific embodiments.

The television sound-generating system in the related art does not actually take into account the depth information of the 3D display, and the sound-generating of an object which appears to the viewer and appears at a certain distance from the screen is still from the depth position of the television itself, which results in that the 3D display cannot perform stereo panoramic sound playing at the same time, so as to realize the perfect fusion of the 3D display and the sound output.

In order to solve the problem that a display device of the 3D display in the related art cannot realize stereo panoramic sound playing and the perfectly merged of 3D display and sound output, the embodiments of the present disclosure provide the sound-generating device, where the plurality of main loudspeakers are provided and arranged in the 3D array, and the first main loudspeaker generating sound in a first direction and a second main loudspeaker generating sound in a second direction are provided, and the first sound wave reflection face of a reflection plate provided in the first direction is used to reflect sound waves emitted by the second main loudspeaker so as to increase the transmission path of sound waves emitted by some loudspeakers to form stereo field playing, extend the sound source depth range of the presented sound, and realize a real stereo panoramic sound effect.

Figure 1:
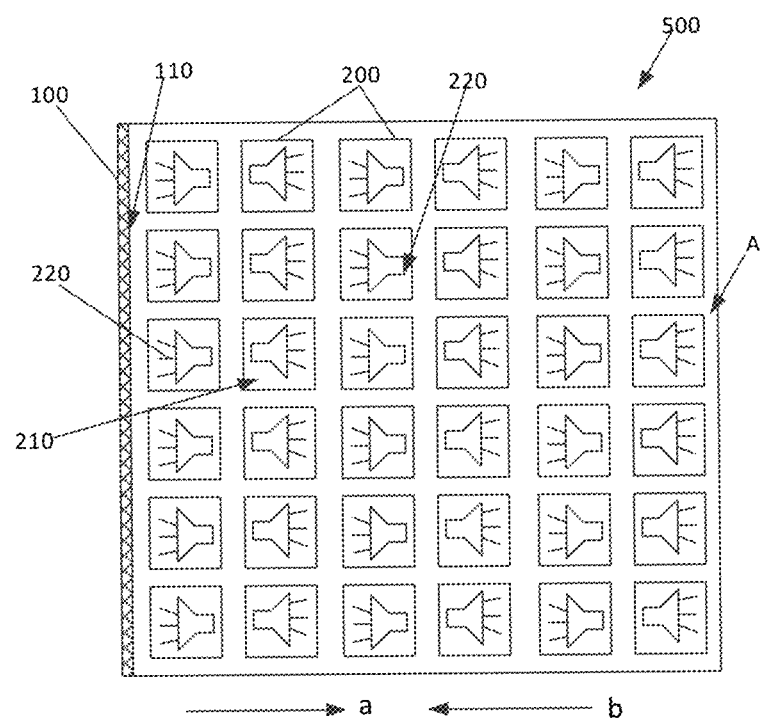
FIG. 1 is a schematic diagram of plane structure of one implementation of a sound-generating device according to an embodiment of the present disclosure.

As shown in FIG. 1, one embodiment of a sound-generating device according to embodiments of the present disclosure, the sound-generating device 500 includes:

a reflection plate 100, which includes a first sound wave reflection face 110 arranged towards a first direction a;

a plurality of main loudspeakers 200, where the plurality of main loudspeakers 200 are distributed in an array in a preset three-dimensional space A, and the preset three-dimensional space A is located at one side of the first sound wave reflection face 110 towards the first direction a;

the plurality of main loudspeakers 200 include first main loudspeakers 210 with a sound-generating direction towards the first direction a, and second main loudspeakers 220 with a sound-generating direction towards the second direction b, where the second direction b is an opposite direction of the first direction a; the sound waves emitted from the second main loudspeakers 220 are transmitted to the first sound wave reflection face 110 and can be reflected by the first sound wave reflection face 110.

Figure 2:
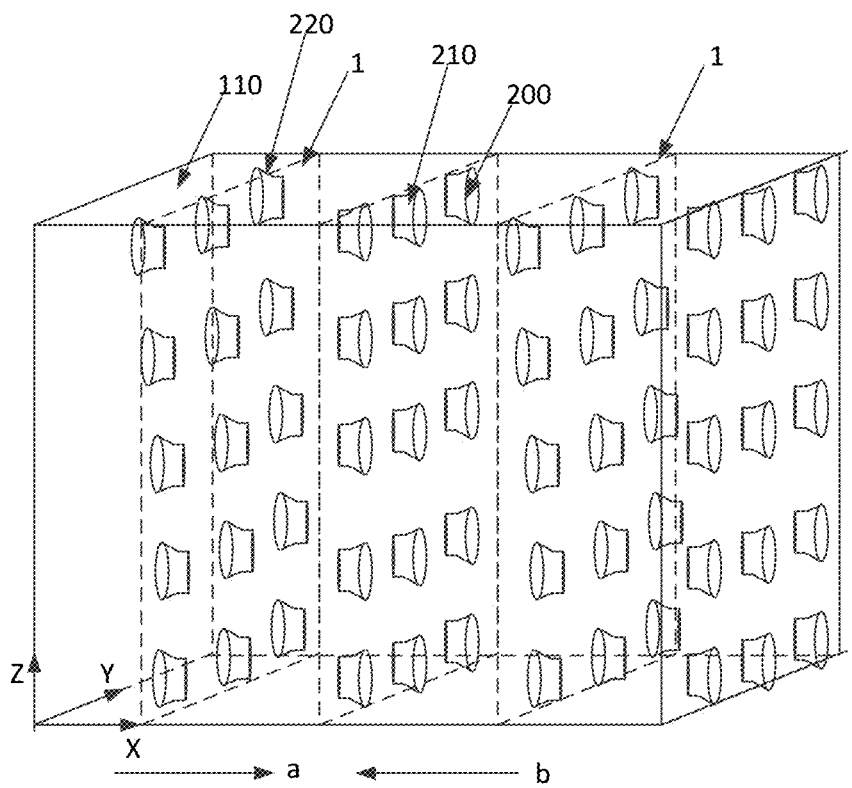
FIG. 2 is a three-dimensional structural diagram of one implementation of a sound-generating device according to an embodiment of the present disclosure.

Specifically, as shown in FIG. 2, the plurality of main loudspeakers 200 are sequentially arranged along an X-axis, a Y-axis, and a Z-axis of a preset three-dimensional space A to form a 3D array arrangement in the preset three-dimensional space A. Optionally, the first sound reflection surface 110 is a plane parallel to the Z-axis, the first direction a is a direction perpendicular to the first sound reflection surface 110 and along the positive direction of the X-axis, and the second direction b is a direction perpendicular to the first sound reflection surface 110 and along the negative direction of the X-axis.

In the embodiment of the present disclosure, by arranging the plurality of main loudspeakers 200 in an array, sound-generating at different depths of a sound source can be realized, and by providing the reflection plate 100 including the first sound wave reflection face 110, the sound waves emitted by the second main loudspeaker 220 are reflected, so as to extend the depth range that can be reached by the sound-generating source, and ensure that a real stereo panoramic sound effect can be realized by using the sound-generating device.

In the embodiment of the present disclosure, optionally, as shown in FIG. 2, a plurality of main loudspeakers 200 are arranged to form a plurality of array layers 1, the plurality of array layers 1 are sequentially arranged along the first direction a, and the centers of the sound-generating surfaces of the main loudspeakers 200 in each array layer 1 are arrayed in a plane parallel to the first sound wave reflection face 110.

Optionally, the main loudspeakers 200 in each array layer 1 are uniformly distributed in the corresponding array layer 1, and the plurality of array layers 1 arranged in sequence are equally spaced in the preset three-dimensional space A, so as to ensure the uniformity of the distribution of the main loudspeakers 200 in the preset three-dimensional space A and the uniformity of sound-generating of different sound sources.

Optionally, in an embodiment of the present disclosure, as shown in FIG. 1 and with reference to FIG. 2, the plurality of array layers 1 include a first array layer and a second array layer arranged alternately, where the plurality of main loudspeakers 200 in the first array layer are all first main loudspeakers 210, and the plurality of main loudspeakers 200 in the second array layer are all second main loudspeakers 220.

Figure 3:
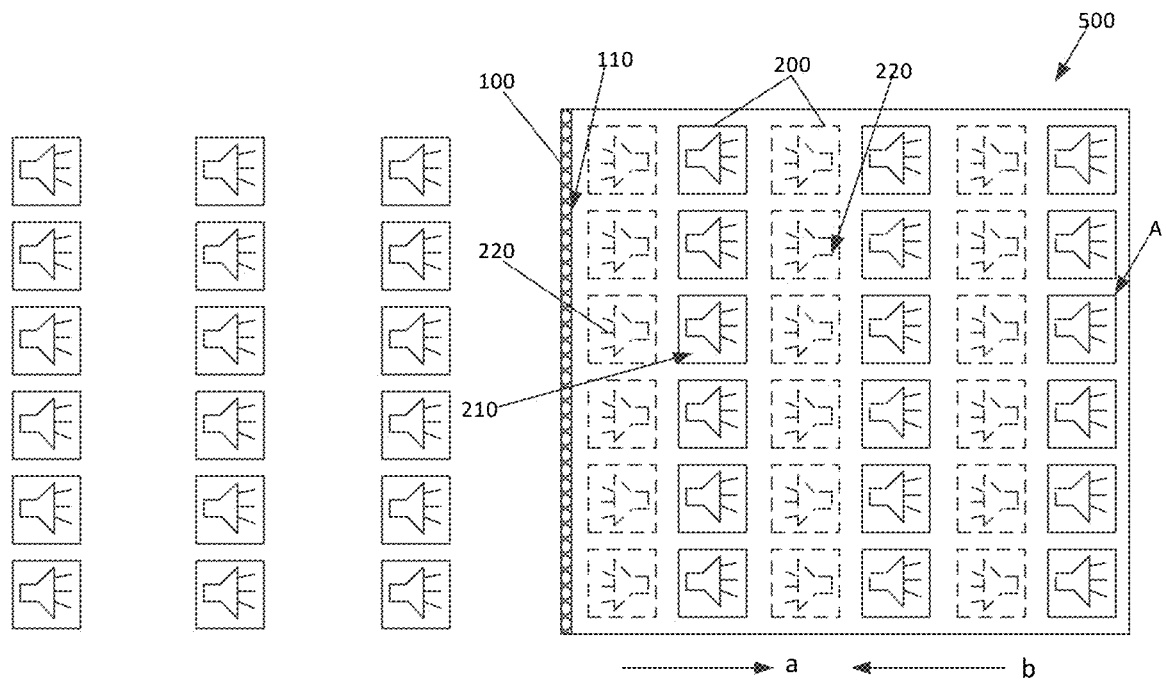
FIG. 3 is a schematic diagram of equivalent sound-generating effect of a sound-generating device according to an embodiment of the present disclosure.

With this implementation structure, the first main loudspeakers 210 and the second main loudspeakers 220 are alternately arranged to form a loudspeaker array equivalent to a sound-generating form as shown in FIG. 3, and the depth range of sound that can be generated by the plurality of loudspeakers 200 is extended by two times using the first sound wave reflection face 110, and the plurality of loudspeakers 200 are uniformly arranged within the extended depth range so as to ensure the sound-generating uniformity of different sound sources.

Figure 4:
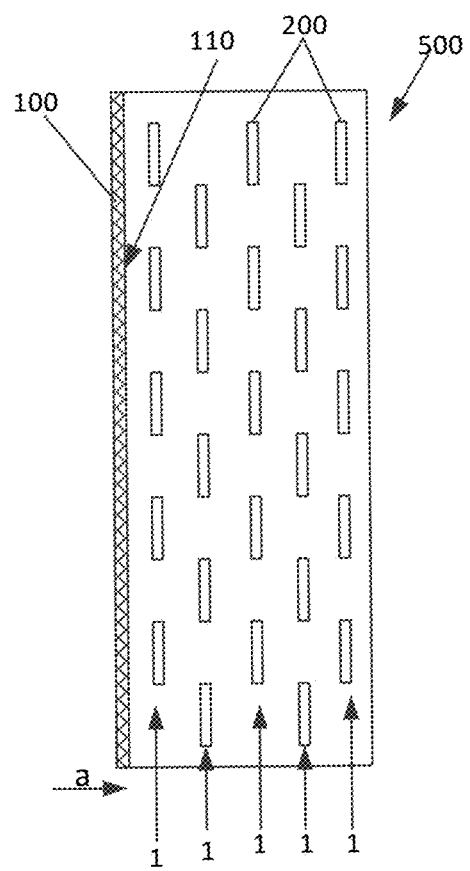
FIG. 4 is a schematic diagram of plane structure of another implementation of a sound-generating device according to an embodiment of the present disclosure.

Further, as shown in FIG. 4 in combination with FIG. 2, in one embodiment of the embodiments of the present disclosure, on the basis of an arrangement structure in which the plurality of main loudspeakers 200 are arranged to form the plurality of array layers 1, and the plurality of array layers 1 are successively arranged along the first direction a, optionally, in two adjacent array layers 1, the orthographic projection of the main loudspeakers 200 of one array layer 1 in the plane of the another array layer 1 does not overlap the main loudspeakers 200 of another array layer 1.

By using the present implementation, the array layers 1 including the plurality of main loudspeakers 200 are arranged in sequence, the main loudspeakers 200 of two adjacent array layers 1 are spaced, and the orthographic projections of the main loudspeakers on the plane where the array layers 1 is located do not overlap, so as to ensure that the plurality of main loudspeakers 200 are arranged uniformly, the sound-generating planes formed by different array layers 1 do not interfere with each other, the mutual shielding of the sounds between the plurality of main loudspeakers 200 is prevented, the sound-generating uniformity effect of different sound sources is achieved, and the problem of sound shielding can be further avoided.

It should be noted that the arrangement of the main loudspeakers 200 in the preset three-dimensional space A in the above-mentioned embodiment shown in FIGS. 3 and 4 is merely an example and is not limited thereto.

For example, another embodiment of the sound-generating device according to an embodiment of the present disclosure can include the plurality of first main loudspeakers 210 and a the plurality of second main loudspeakers 220 in each array layer 1, respectively, and the plurality of the first main loudspeakers 210 and the plurality of second main loudspeakers 220 are spaced apart and uniformly distributed from each other in the array layer 1.

With the above-mentioned embodiment, the arrangement structure in which the plurality of first main loudspeakers 210 and the plurality of second main loudspeakers 220 are uniformly distributed can also be formed in the preset three-dimensional space A, so as to form stereo field playing, extend the sound source depth range of the presented sound, and achieve the effect of real stereo panoramic sound.

Figure 5:
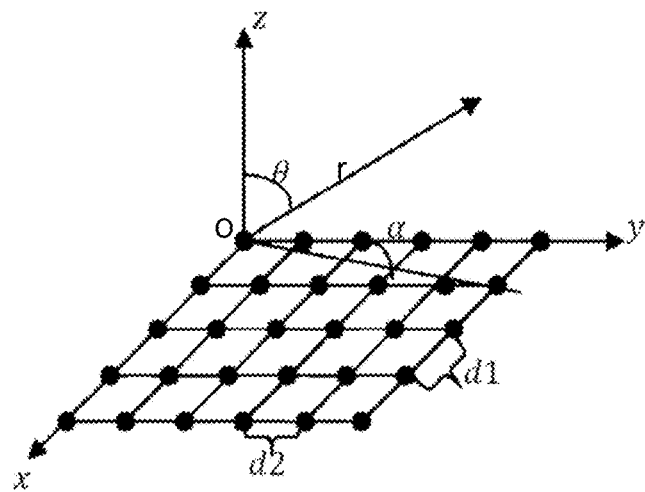
FIG. 5 is a schematic diagram of an arrangement of a loudspeaker array in one of the array layers in a sound-generating device according to an embodiment of the present disclosure.

Specifically, as shown in conjunction with FIGS. 2 and 5, each array layer 1 includes the plurality of uniformly arranged main loudspeakers 220 to form a uniform plane loudspeaker array, where each array layer 1 corresponds to a sound-generating plane with a depth, and the sound-generating directions are the same direction, so as to reduce unnecessary energy dispersion.

With the sound-generating device according to the embodiments of the present disclosure, by forming the plurality of main loudspeakers 200 arranged in the array in the preset three-dimensional space A, the sound-generating direction of the sound source formed by the plurality of main loudspeakers 200 has the characteristic of spatial directional. Optionally, the characteristic of spatial directional can be presented by a directional function.

It should be noted that for the sound-generating array including the plurality of main loudspeakers 200, a directivity function is a spatial distribution function describing the sound field (free far field) radiated by the sound-generating array. As shown in FIG. 5, setting the Z-axis as the direction of the maximum value of the sound wave beam, where $\alpha$ is an angle between a first position point on a spherical surface which has a distance r from the sound source O and the Y-axis direction, $\theta$ is the angle between the first position point and the Z-axis direction, and $p(\alpha, \theta)$ is a complex sound pressure amplitude at the first position point; $\alpha_0$ is the angle between the second position point and the Y-axis direction of the sphere which has a distance r from the sound source O in the Z-axis direction, $\theta_0$ is the angle between the second position point and the Z-axis direction, and $p(\alpha_0, \theta_0)$ is the complex sound pressure amplitude at the second position point, then a normalized sound pressure directivity function is:

$$D(\alpha, \theta) = \frac{|p(\alpha, \theta)|}{|p(\alpha_0, \theta_0)|}$$

specifically, when the number of the main loudspeakers 200 in the X-axis direction is M, the distance between the plurality of main loudspeakers 200 is d1; when the number of main loudspeakers 200 in the Y-axis direction is N and the distance between the plurality of main loudspeakers 200 is d2, the sound pressure directivity function can be expressed as:

$$D(\alpha, \theta) = \frac{\sin\left(\frac{\pi M d_1}{\lambda}\cos\alpha\sin\theta\right)}{M\sin\left(\frac{\pi d_1}{\lambda}\cos\alpha\sin\theta\right)} \cdot \frac{\sin\left(\frac{\pi N d_2}{\lambda}\sin\alpha\sin\theta\right)}{N\sin\left(\frac{\pi d_2}{\lambda}\sin\alpha\sin\theta\right)}$$

According to the above-mentioned principle, when the sound-generating device is applied to the display device, the sound-generating direction of the sound field generated by the plurality of main loudspeakers 200 is set as an orientation of the display screen, for example, the Z-axis direction, and in the case of determining the size of the display screen, using the above-mentioned sound pressure directivity function and through simulation calculation, design parameters such as the number of main loudspeakers 200 required in each array layer 1 and the spacing between adjacent main loudspeakers 200 can be determined; furthermore, the distance between adjacent array layers 1 can be flexibly set according to the size of the display screen. Thus, the sound-generating device according to the above-mentioned embodiment of the disclosed embodiment can be obtained.

Figure 6:
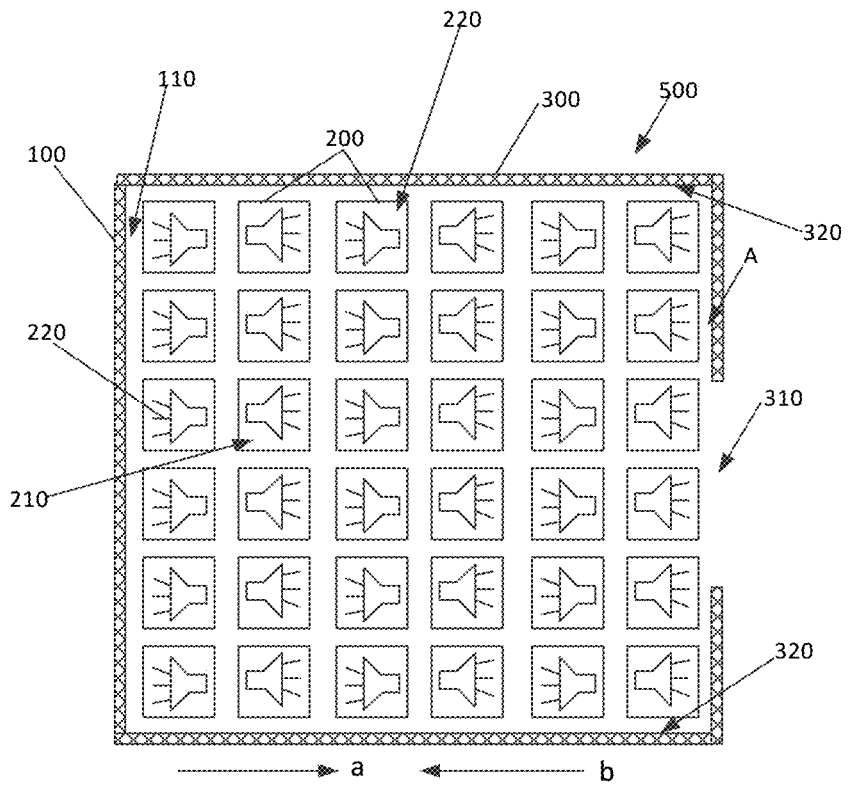
FIG. 6 is a schematic diagram of plane structure of another implementation of a sound-generating device according to an embodiment of the present disclosure.

The sound-generating device according to an embodiment of the present disclosure, where, as shown in FIG. 6, the sound-generating device includes a shell 300 arranged around the preset three-dimensional space A, where a sound-generating outlet 310 is provided on a first side face of the shell 300, and a second side face of the shell 310 opposite to the first side face is a reflection plate 100;

the first side face except for the part of the sound-generating outlet 310 and the other side faces of the shell 300 are further provided with a second sound wave reflection face 320; and other side faces are connected to the first side face and the second side face.

By using the implementation structure, the sound-generating device is provided with the reflection plate 100 on the second side face opposite to the sound-generating outlet 310, so that sound waves emitted by the plurality of second main loudspeakers 220 which generate sound toward the second side face can be reflected by the first sound wave reflection face 110 of the reflection plate 100 and then transmitted toward the sound-generating outlet 310; in addition, the second sound wave reflection face 320 is further provided on the other surfaces connected to the first side face and the second side face, so that the sound wave reflected by the first sound wave reflection face 110 is output from the sound-generating outlet 310 after being reflected a plurality of times in the preset three-dimensional space A, and a greater sound depth can be obtained.

By using the sound-generating device according to the embodiments of the present disclosure, by using the first sound wave reflection face of the reflection plate which is arranged towards the first direction to reflect the sound wave emitted by the second main loudspeakers, the transmission path of the sound wave emitted by some loudspeakers can be increased to form stereo field playing, and the sound source depth range of the presented sound can be expanded to realize a real stereo panoramic sound effect.

The embodiment of the present disclosure further provides the display device, which includes the sound-generating device as described in any above-mentioned embodiment.

Figure 7:
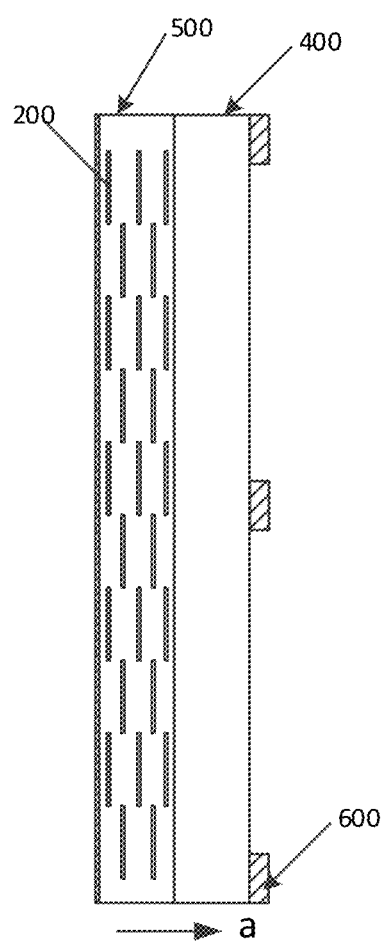
FIG. 7 is a schematic structural diagram of a side face of a display device according to an embodiment of the present disclosure.

Optionally, as shown in FIG. 7, the display device further includes a display component 400, where the sound-generating device 500 is arranged on a surface of the display component 400 facing away from the display screen, or inside the display component 400.

Specifically, in conjunction with FIGS. 1 to 6, and according to the above description, the sound-generating device 500 includes an emitting plate 100 and the plurality of first main loudspeakers 210 and the plurality of second main loudspeakers 220 arranged in the preset three-dimensional space A, where the first sound wave reflection face 110 of the emitting plate 100 towards the first direction a, the first direction a is the orientation direction of the display screen of the display component 400. Optionally, the sound-generating device 500 is provided with a sound-generating outlet 310 on a side face towards the first direction a for outputting sound towards the first direction a. Optionally, the side face of the sound-generating device 500 on which the sound-generating outlet 310 is arranged can locate in the same plane as the display screen of the display component 400.

In one implementation means of the display device according to the embodiment of the present disclosure, the sound-generating device 500 is integrated into the surface of the display component 400 facing away from the display screen, forming a structure that is mounted separately from the display component 400.

In another embodiment, the sound-generating device 500 can also be arranged in the display component 400 to form an integrally mounted structure with the display component 400.

Combined with FIGS. 1 to 6, a person skilled in the art should be able to understand the specific means in which the sound-generating device described in the embodiments of the present disclosure when mounted on the display device, detailed description will be given herein.

By using the display device according to the embodiments of the present disclosure, the sound-generating device with the above-mentioned implementation structure is mounted on the display component, so that the audio data of the audio and video data output by the display component can be played via the sound-generating device, and by controlling the audio signals output by the different main loudspeakers, a stereo play effect in the screen at different depths compared with the display component is presented.

Figure 8:
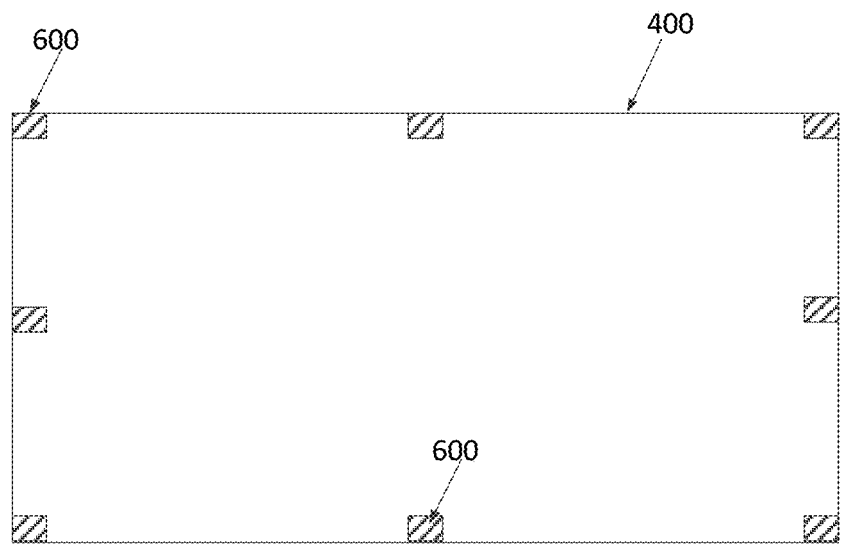
FIG. 8 is a schematic diagram of plane structure of a display device according to an embodiment of the present disclosure.

Optionally, when implementing the display device described in the present disclosure, on the basis of arranging the sound-generating device 500, as shown in FIGS. 7 and 8, the plurality of sub-loudspeakers 600 are distributed around the display screen on the display component 400, and the sound-generating direction of the sub-loudspeakers 600 is directed away from the display screen, that is, towards the first direction a.

By mounting the plurality of sub-loudspeakers 600 around the edge of the display screen on the display component 400, the plurality of sub-loudspeakers 600 cooperate with the sound-generating device 600 to play audio data together to generate a screen sound effect.

Figure 9:
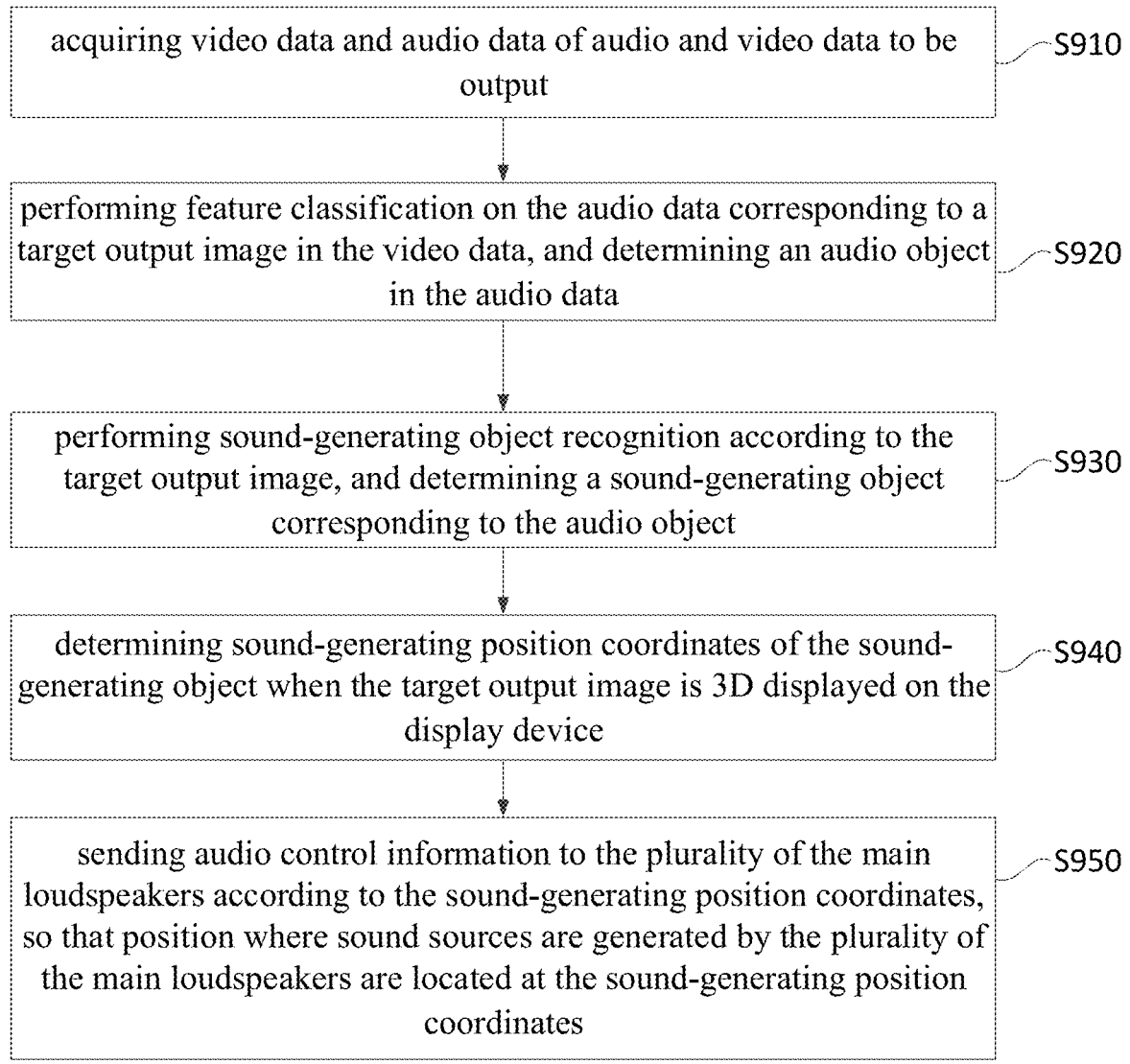
FIG. 9 is a schematic flow diagram of a sound-generating controlling method according to the embodiment of the present disclosure.

Other aspect of the embodiment of the present disclosure also provides the sound-generating controlling method, where the method is applied to any of the above-mentioned display devices, as shown in FIG. 9, the method includes the following steps:

S910, acquiring video data and audio data of audio and video data to be output;

S920, performing feature classification on the audio data corresponding to a target output image in the video data, and determining an audio object in the audio data;

S930, performing sound-generating object recognition according to the target output image, and determining a sound-generating object corresponding to the audio object;

S940, determining sound-generating position coordinates of the sound-generating object when the target output image is 3D displayed on the display device; and S950, sending audio control information to the plurality of the main loudspeakers according to the sound-generating position coordinates, so that position where sound sources are generated by the plurality of the main loudspeakers are located at the sound-generating position coordinates.

By using the sound-generating controlling method according to the embodiments of the present disclosure, using the display device with the above-mentioned implementation structure, video data of audio and video data to be output can be output on the display device to present the 3D image display, and sound-generating position coordinates of the sound-generating object can be determined according to the audio data of the audio and video data; and when the audio data is output, position of sound sources generated by the plurality of main loudspeakers are located at the sound-generating position coordinates, the stereo panoramic sound effect is present, and perfect fusion of sound and video is achieved.

It should be noted that when the display device outputs the audio and video data, which includes video data and audio data, the video data is output to the display component and displayed via the display component; the audio data is output onto and through the sound-generating device, and the output audio data matches the displayed image of the video data output on the display component.

Specifically, for each frame of image output by the display component, the sound-generating device outputs matched audio data, where the unprocessed audio data includes complex sounds of different sound sources in the scene displayed by the image, such as including background sounds, sounds triggered by people or scenes in the image, etc. Based on the audio data, using the method described in embodiments of the present disclosure, for each frame of the target output image output to the display component, the matched audio data is determined, and the matched audio data is classified to determine audio objects in the audio data.

Specifically, in S920, the audio objects in the audio data can be classified according to the content semantics and the context semantic relationship of the audio data, and different audio objects in the audio data, such as voices of different people, animal voices, music and background sounds, etc. are determined.

Specifically, a particular process of feature classification of audio data can include:

1) analyzing the audio data to extract audio features in the audio data;

optionally, the audio features include a frequency-domain feature and a wavelet-domain feature; optionally, the frequency-domain feature includes: any one of a linear prediction cepstral coefficient and a Mel frequency cepstral coefficient; the wavelet-domain feature includes any one of a wavelet-domain zero crossing rate, a wavelet-domain centroid, and a wavelet-domain low frequency sub-band energy.

2) integrating extracted audio features to establish a feature vector;

3) classifying and recognizing the integrated feature vector, and determining different audio objects in the audio data.

the algorithm of classifying and recognizing the integrated feature vector can use a Support Vector Machine (SVM) algorithm, a Nearest Neighbor (NN) algorithm, and a Nearest Center (NC) algorithm.

In S920, feature classification is performed on the audio data corresponding to the target output image to determine the audio object in the audio data, and further, in S930, the sound-generating object identification is performed according to the target output image to determine the sound-generating object corresponding to the audio object.

Specifically, when performing the feature classification according to the audio data of the target output image, it is also necessary to perform classification on the image information displayed in the target output image so as to identify the sound-generating object in the target output image, such as identifying a person, an animal, etc.

Specifically, when image information displayed on the target output image is classified, processes such as picture classification, sound-generating object target position, and target detection need to be performed, where executing picture classification needs to determine a category to which the input target output image belongs; performing sound-generating object target positioning needs to determine the position of the sound-generating object in the target output image; and performing target detection needs to determine the classification, confidence, and specific position of the sound-generating object. Specifically, any one of a conventional object detection algorithm, an object detection algorithm based on artificial feature extraction, and an object detection algorithm based on deep learning, etc. can be used in object detection. A person skilled in the art should have been able to classify and detect the target output image according to the above-mentioned detection algorithms so as to determine the sound-generating object in the target output image.

Further, according to the time-domain information about the sound emitted by the audio object in the audio data, and according to the sound-generating action information of the sound-generating object in the target output image, such as lip motion information, each frame of the output images of the audio data and the video data is matched so as to determine the sound-generating object corresponding to each audio object in the audio data in the target output images.

Figure 10:
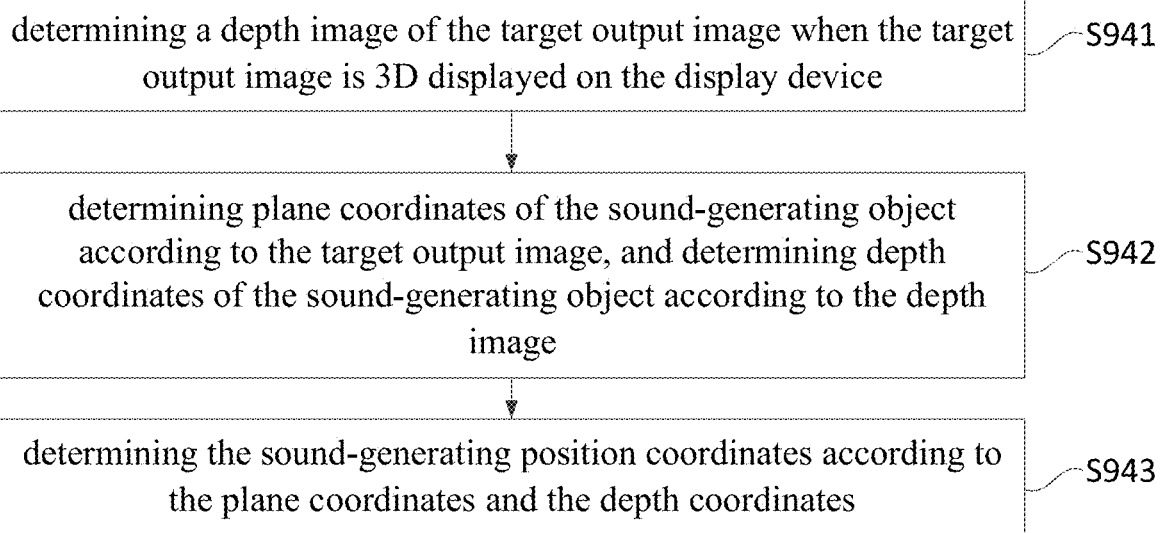
FIG. 10 is a schematic flow diagram of S940 in FIG. 9.

Optionally, as shown in FIG. 10, in S940, the step of determining vocal position coordinates of the sound-generating object when the target output image presents a 3D display effect on the display device, includes:

S941, determining a depth image of the target output image when the target output image is 3D displayed on the display device;

S942, determining plane coordinates of the sound-generating object according to the target output image, and determining depth coordinates of the sound-generating object according to the depth image; and S943, determining the sound-generating position coordinates according to the plane coordinates and the depth coordinates.

It can be understood that when the target output image is 3D displayed on the display device, the scene on the target output image exhibits a certain display depth compared to the display device, so that the input video data has a corresponding depth image.

In some embodiments, the target output image includes a first view image and a second view image, where the first view image and the second view image are images of different views of the same sound-generating object, and the step of determining a depth image of the target output image when the target output image is 3D displayed on the display device includes:

determining a pixel point corresponding to each pixel point in the first view image on the second view image in the target output image, and calculating and obtaining parallax of each pixel point in the first view image;

calculating and obtaining the depth value of each pixel point in the first view image according to the parallax of each pixel point in the first view image and following formulas, so as to obtain the depth image of the first view image; and $$\frac{T-(x_1-x_r)}{Z-f} = \frac{T}{Z} \Rightarrow \frac{fT}{x_1-x_r} = \frac{fT}{d} = Z$$

presenting the depth image of the first view image as the depth image when the target output image is 3D displayed on the display device, where, in the above formula, Z is a depth value of any pixel point in a first view image, T represents a distance between optical axis centres $O_l$ and $O_r$ of a first camera and a second camera photographing the first view image and the second view image, $x_l$ is an abscissa of any pixel point in the first view image on a projection plane of the first camera, $x_r$ is an abscissa of a corresponding pixel point in the second view image on a projection plane of the second camera, f is a focal length of the first camera and the second camera, and $d=x_l-x_r$ is a parallax of any pixel point in the first view image.

Figure 11:
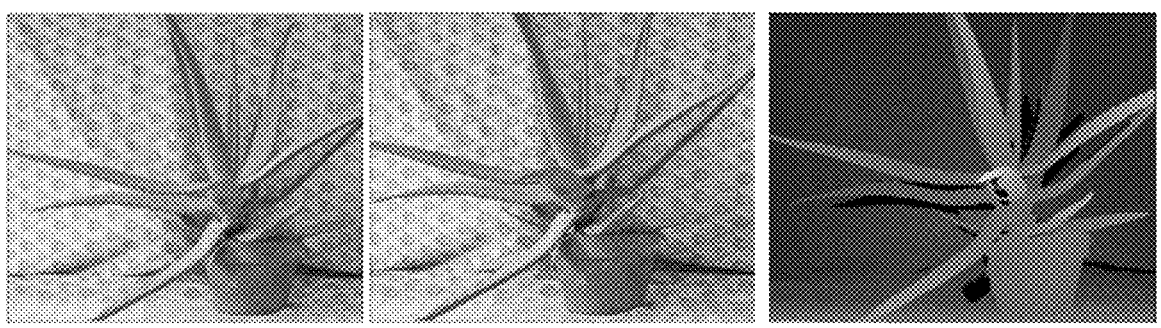
FIG. 11 (*a*), FIG. 11 (*b*), and FIG. 11 (*c*) are schematic diagrams of a left-right view, a left-right view, and a depth map, respectively, of the same object in an embodiment of the present disclosure.

Specifically, video formats of video sources conventionally used for 3D display include: left and right views, top and bottom views, video plus depth (V+D), multi-view video plus depth (MVD), and layered depth video (LDV), etc. Therefore, the first view image and the second view image can be a left-right view and a top-bottom view of the same sound-generating object, respectively. For example, FIG. 11 (a) is a left view of the plant, FIG. 11 (b) is a right view of the plant, and FIG. 11 (c) is a depth map of the plant.

In some embodiments, when the target output image is the video plus depth (V+D), a multi-view video plus depth (MVD), and a layered depth video (LDV), etc. since it contains a depth image, the depth image can be directly acquired according to a video source without using the above-mentioned formula for calculation.

In one embodiment, when the video format of an input video source is the left-right view, the depth image of the image can be obtained by the method for solving binocular parallax, and the specific steps can include:

1) obtaining the parallax by using the stereo matching algorithm;

where the basic object of a stereo matching algorithm is: the disparity image is calculated by determining corresponding pixel points in the target output image where each pixel point of one view angle is on the image of the other view angle.

Figure 12:
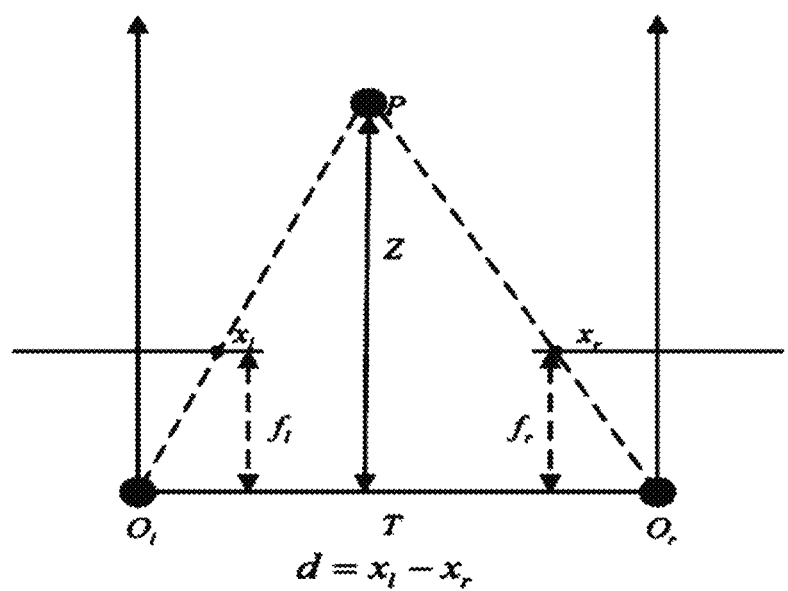
FIG. 12 is a schematic diagram of the relationship between structural parameters during a 3D display process.

2) acquiring the depth image from the parallax;

with reference to FIG. 12, when it is determined that the distance between the optical axis centers $O_l$ and $O_r$ of the left and right cameras corresponding to the target output image is T, the focal lengths of the left and right cameras are $f_l$ and $f_r$ (the two are generally equal to f), and the horizontal coordinate of the position point P with a certain depth on the target output image on the projection plane of the left and right cameras is $x_l$ and $x_r$, respectively, according to the principle of similarity of triangles, a calculation formula for the distance Z from the position point P to the optical axis centers of the left and right cameras can be determined as follows:

$$\frac{T-(x_l-x_r)}{Z-f} = \frac{T}{Z} \Rightarrow \frac{fT}{x_l-x_r} = \frac{fT}{d} = Z$$

It can be seen from the above-mentioned calculation formula that there is an inverse proportion relationship between the distance Z, which is between the position point P and the center of the optical axis of the left and right cameras, and the parallax d, and thus it can be seen that when the parallax d of a certain position point is determined, the depth value Z can be calculated according to the above formula.

Thus, a corresponding depth image can be determined according to the disparity image in each target output image in the input video.

In one embodiment, when the video format of the input video source is the top-bottom view, since the top-bottom view completely saves the horizontal resolution of the original left and right views, and the vertical resolution is lost by half, the depth image in the video format of the top-bottom view can be obtained by a binocular disparity solving method in the same principle as the left and right views determining the depth image.

In one embodiment, when the video format of the input video source is video plus depth image, the input video source includes a color map and a corresponding depth image, so that the depth image can be directly acquired according to the video source.

In one embodiment, when the video format of the input video source is multi-path video plus depth image, the video source input includes the transmitted 2D video sequence and the corresponding depth image sequence, so that the depth image can be directly acquired according to the video source.

In one embodiment, when a video format of the input video source is a layered depth video, video data of the input video source decomposes a 3D scene into a foreground and a background with regard to a scene with a small depth level, and inputs a color image and a depth image of the foreground and the background; and the depth image can thus be acquired directly from the video source.

Therefore, according to the different types of video sources described above, corresponding depth images can be determined separately in S941.

Further, in S942, according to the target output image, it is possible to determine the plane coordinates of the sound-generating object in the image, namely, the two-dimensional coordinates in the plane where the X direction and Y direction are located, and according to the determined depth image, it is possible to determine the depth coordinates of the sound-generating object, namely, the coordinates in the Z direction. In this way, the 3D position (x, y, z) of the target output image in the three-dimensional space can be determined, thereby determining the position of the sound source.

Since the video source needs to be displayed on the display device, in order to present the corresponding stereo play effect on the play scene of the display device, it is necessary to further determine, via S940, the sound-generating position coordinates of the sound-generating object when the target output image is 3D displayed on the display device, that is to say, for the display device, it is also necessary to convert the sounding position (x, y, z) of the sound-generating object into the display coordinate system $(x_1, y_1, z_1)$ so as to be able to use the set sound-generating device when the display device plays the 3D display effect of the video data; and in a playing environment where the display device is located, the stereo panoramic sound playing effect is synchronously presented.

Accordingly, in an embodiment of the present disclosure, in S943, determining the location coordinates of the sound-generating object according to the plane coordinates and the depth coordinates, including:

determining the 3D image coordinates of the sound-generating object according to the plane coordinates and the depth coordinates; and converting the coordinates of the 3D image into a coordinate system determined according to the display component, and determining the sound-generating position coordinates, where a coordinate system defined by taking one position point on the display screen of the display component as an origin, taking one edge of the display screen as an X direction, the other adjacent edge as a Y direction, and the direction perpendicular to the display screen as a Z direction can be determined as the coordinate system determined according to the display component.

With the sound-generating controlling method according to the embodiments of the present disclosure, in the above-mentioned means, when the position coordinates of each sound-generating object in the display coordinate system and the audio data of the corresponding sound-generating object in each target output image are determined, and the corresponding audio data is input to each main loudspeaker of the sound-generating device, the stereo sound field is replayed or the stereo sound field distribution mode is controlled by adjusting the amplitude and phase of the input signal of each main loudspeaker, so that the panoramic sound playing effect of the sound-generating object in the corresponding playing scene can be presented.

Optionally, according to different control targets, the above-mentioned sound control when performing audio data input to each main loudspeaker can include two types: the first is sound field replay, namely, generating a desired sound field in space, such as a plane wave, etc.; the second is beamforming, i. e. directivity determination, which controls the propagation of sound waves in a specific direction and focuses the sound energy in a specific area while keeping the sound energy low in other areas.

Specifically, the first sound field replay method is:

for target sounds that separate different sound-generating objects from the audio: including voices of different persons, voices of animals, etc. since the 3D position of the sound-generating object has been determined, when the loudspeaker of the corresponding position is made to sound, the sound of the corresponding position can be generated, where, for the background sound which is not separated or the sound field which is more complex, a sound field replay technology can be adopted to use the area array loudspeaker array (the main loudspeaker in the array plane) at a certain depth in the 3D main loudspeaker array, so as to generate the playing effect of the 3D sound field.

According to the above principle, by using the sound-generating controlling method according to the embodiment of the present disclosure, in combination with the 3D image display of the display device, it is possible to simultaneously present the stereo panoramic sound playing effect, so as to realize the perfect fusion of sound and video.

Figure 13:
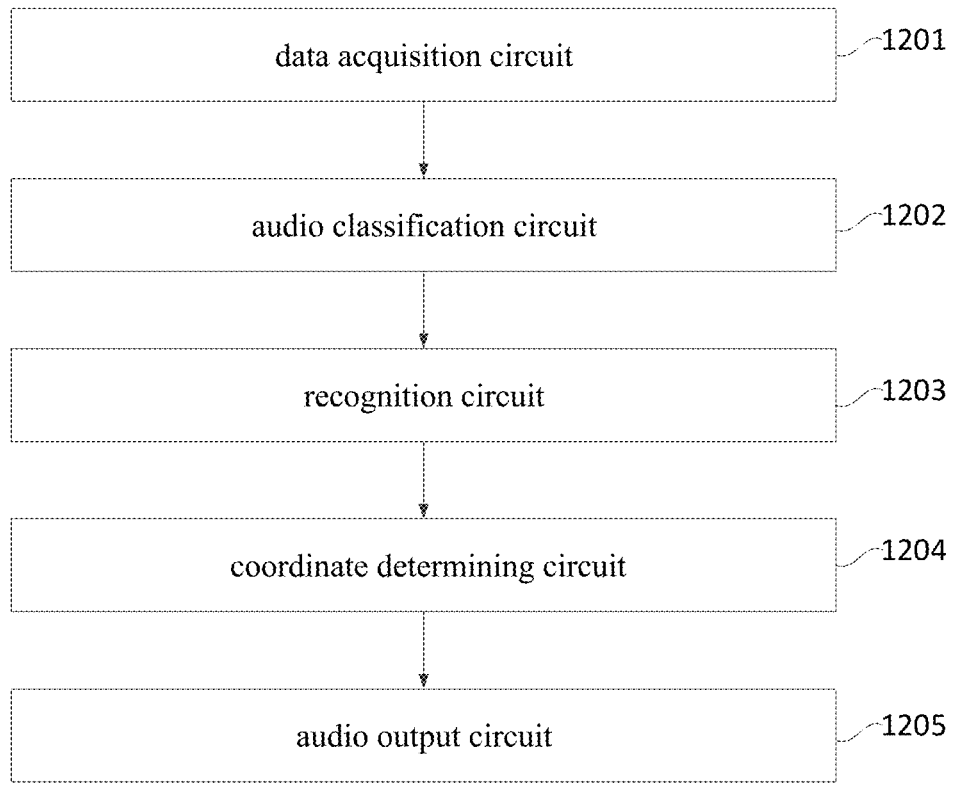
FIG. 13 is a schematic structural diagram of a sound-generating controlling device according to an embodiment of the present disclosure.

Another embodiment of the present disclosure also provides sound-generating controlling device which is applied on any of the above-mentioned display device, as shown in FIG. 13, the sound-generating controlling device includes:

a data acquisition circuit 1201, which is used for acquiring the video data and the audio data of audio and video data to be output;

an audio classification circuit 1202, which is used for performing the feature classification on the audio data corresponding to the target output image in the video data and determining the audio object in the audio data;

a recognition circuit 1203, which is used for performing the sound-generating object recognition according to the target output image, and determining the sound-generating object corresponding to the audio object;

a coordinate determining circuit 1204, which is used for determining the sound-generating position coordinates of the sound-generating object when the target output image is 3D displayed on the display device; and an audio output circuit 1205, which is used for sending audio control information to the plurality of the main loudspeakers according to the sound-generating position coordinates, so that the positions of sound sources generated by the plurality of the main loudspeakers are located at the sound-generating position coordinates.

Optionally, in the sound-generating object control device, where the coordinate determining circuit 1204 determines the coordinates of the position of the sound-generating object of the sound-generating object when the target output image is 3D displayed on the display device, including:

determining a depth image of the target output image when the target output image is 3D displayed on the display device;

determining plane coordinates of the sound-generating object according to the target output image, and determining depth coordinates of the sound-generating object according to the depth image; and determining the sound-generating position coordinates according to the plane coordinates and the depth coordinates.

Optionally, in the sound-generating object control device, where the coordinate determining circuit 1204 determines the sound-generating object position coordinates according to the plane coordinates and the depth coordinates, including:

determining the 3D image coordinates of the sound-generating object according to the plane coordinates and the depth coordinates; and converting the coordinates of the 3D image into a coordinate system determined according to the display component, and determining the sound-generating position coordinates.

Figure 14:
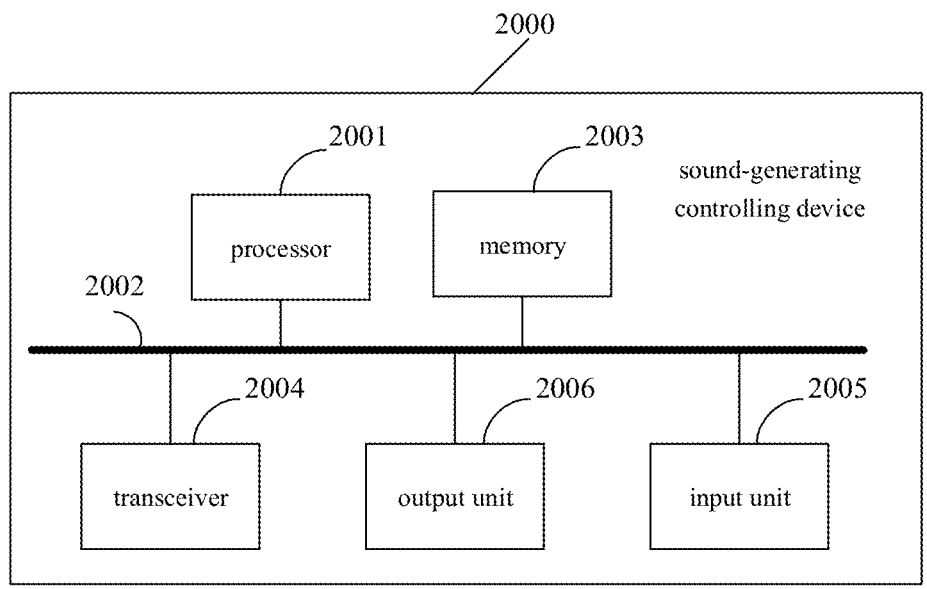
FIG. 14 is another schematic structural diagram of a sound-generating controlling device according to an embodiment of the present disclosure.

As shown in FIG. 14, the embodiment of the present application also provides a sound-generating controlling device 2000, which includes: a processor 2001 and a memory 2003, where the processor 2001 and the memory 2003 are electrically coupled, such as via a bus 2002;

the processor 2001 can be a Central Processing Unit (CPU), a general purpose processor, a Digital Signal Processor (DSP), an Application Specific Integrated Circuit (ASIC), a Field-Programmable Gate Array (FPGA) or other programmable logic devices, a transistor logic device, a hardware component, or any combination thereof. Various illustrative logical blocks, modules, and circuits described in connection with the present disclosure can be implemented or performed. The processor 2001 can also be a combination that performs computing functions, including, for example, a combination of one or more microprocessors, a combination of a DSP and a microprocessor, etc.

The bus 2002 can include a path to transfer information between the components described above. The bus 2002 can be a Peripheral Component Interconnect (PCI) bus or a Extended Industry Standard Architecture (EISA) bus or the like. The bus 2002 can be divided into an address bus, a data bus, a control bus, etc. For ease of illustration, only one bold line is shown in FIG. 7, but does not indicate that there is only one bus or type of bus.

The memory 2003 can be, but is not limited to, a ROM (Read-Only Memory) or other type of static storage device that can store static information and instructions, a RAM (Random Access Memory), or other types of dynamic storage devices that can store information and instructions, or can also be EEPROM (Electrically Erasable Programmable Read Only Memory), CD-ROM (Compact Disc Read Only Memory), or other optical disc storage, the optical disc storage (including a compact disc, a laser disc, an optical disc, a digital universal disc, a blue-ray disc and the like), a disk storage medium or other magnetic storage equipment, or any other medium configurable to contain or store an expected program code in an instruction or data structure form and accessible for a computer.

Optionally, the sound-generating controlling device 2000 can further include a transceiver 2004, where the transceiver 2004 can be used for receiving and transmitting signals; the transceiver 2004 can allow the sound-generating controlling device 2000 to communicate wirelessly or wired with other devices to exchange data. It should be noted that the transceiver 2004 is not limited to one in practice.

Optionally, the sound-generating controlling device 2000 can further include an input unit 2005, where the input unit 2005 can be used for receiving input numbers, characters, images and/or sound information, or to generate key signal inputs related to user settings and function controls of the sound-generating controlling device 2000; the input unit 2005 can include, but is not limited to, one or more of a touch screen, a physical keyboard, function keys (such as volume control keys, switch keys, etc.), a trackball, a mouse, a joystick, a camera, a microphone, etc.

Optionally, the sound-generating controlling device 2000 can further include an output unit 2006, where the output unit 2006 can be used for outputting or presenting information processed by the processor 2001; the output unit 2006 can include, but is not limited to, one or more of a display device, a loudspeaker, a vibration device, etc.

Although FIG. 14 illustrates the sound-generating controlling device 2000 having various devices, it should be understood that not all of the illustrated devices are required to be implemented or provided. More or fewer devices can alternatively be implemented or provided.

Optionally, the memory 2003 is used for storing application code for executing the disclosed solutions and the execution is controlled by the processor 2001. The processor 2001 is used for executing the application code stored in the memory 2003 to implement any of the sound-generating controlling method provided by embodiments of the present disclosure.

The embodiments of the present disclosure provide the computer-readable storage medium which stores computer programs, when the computer programs are executed by the processor, any of the sound-generating controlling methods is implemented.

While the foregoing is directed to optional embodiments of the present disclosure, it will be understood by those skilled in the art that various improvements and modifications may be made without departing from the principle of the present disclosure, and theses improvement and modifications shall fall within the scope of protection of the present disclosure.

What is claimed is:

1. A sound-generating device, comprising:
a reflection plate, including a first sound wave reflection face arranged towards a first direction;
a plurality of main loudspeakers, wherein the plurality of main loudspeakers is distributed in an array in a preset three-dimensional space, and the preset three-dimensional space is located at one side of the first sound wave reflection face towards the first direction; and
the plurality of the main loudspeakers, including first main loudspeakers with a direction of sound production towards the first direction, and second main loudspeakers with a direction of sound production towards a second direction, wherein the second direction is opposite to the first direction; and the sound waves emitted by the second main loudspeakers are transmitted to the first sound wave reflection face and can be reflected by the first sound wave reflection face;
wherein the plurality of main loudspeakers is arranged in a plurality of array layers, the plurality of array layers is arranged in sequence along the first direction, centers of sound-generating surfaces of the plurality of main loudspeakers in each of the plurality of array layers are arranged in an array in a plane parallel to the first sound wave reflection face.

2. The sound-generating device according to claim 1, wherein the plurality of the array layers includes a first array layer and a second array layer arranged alternately, wherein the plurality of the main loudspeakers in the first array layer are all first main loudspeakers and the plurality of the main loudspeakers in the second array layer are all second main loudspeakers.

3. The sound-generating device according to claim 1, wherein each of the plurality of array layers includes a plurality of first main loudspeakers and a plurality of second main loudspeakers respectively, and the plurality of the first main loudspeakers and the plurality of the second main loudspeakers are spaced apart and uniformly distributed from each other in the array layer.

4. The sound-generating device according to claim 1, wherein an orthographic projection of the main loudspeaker of one of two adjacent array layers onto a plane of the other array layer does not overlap the main loudspeaker of the other array layer.

5. The sound-generating device according to claim 1, wherein the sound-generating device includes a shell arranged around the preset three-dimensional space, a sound-generating outlet is provided on a first side face of the shell, and a second side face of the shell opposite to the first side face is the reflection plate,
wherein a portion of the first side face excluding the sound-generating outlet and other side faces of the shell are further provided with a second sound wave reflection face; and the other side is connected to the first side and the second side.

6. A display device, comprising a sound-generating device, wherein the sound-generating device comprises:
a reflection plate, including a first sound wave reflection face arranged towards a first direction;
a plurality of main loudspeakers, wherein the plurality of main loudspeakers is distributed in an array in a preset three-dimensional space, and the preset three-dimensional space is located at one side of the first sound wave reflection face towards the first direction; and
the plurality of the main loudspeakers, including first main loudspeakers with a direction of sound production towards the first direction, and second main loudspeakers with a direction of sound production towards a second direction, wherein the second direction is opposite to the first direction; and the sound waves emitted by the second main loudspeakers are transmitted to the first sound wave reflection face and can be reflected by the first sound wave reflection face;
wherein the plurality of main loudspeakers is arranged in a plurality of array layers, the plurality of array layers is arranged in sequence along the first direction, centers of sound-generating surfaces of the plurality of main loudspeakers in each of the plurality of array layers are arranged in an array in a plane parallel to the first sound wave reflection face.

7. The display device according to claim 6, wherein the display device further includes a display component, the sound-generating device is arranged on a surface of the display component facing away from the display screen, or arranged inside the display component.

8. The display device according to claim 7, wherein the display device further includes a plurality of sub-loudspeakers surrounding the display screen provided on the display component, and sound-generating directions of the sub-loudspeakers are arranged facing away from the display screen.

9. A sound-generating controlling method, applied to a display device comprising a sound-generating device, wherein the sound-generating device comprises:
a reflection plate, including a first sound wave reflection face arranged towards a first direction;
a plurality of main loudspeakers, wherein the plurality of main loudspeakers is distributed in an array in a preset three-dimensional space, and the preset three-dimensional space is located at one side of the first sound wave reflection face towards the first direction; and
the plurality of the main loudspeakers, including first main loudspeakers with a direction of sound production towards the first direction, and second main loudspeakers with a direction of sound production towards a second direction, wherein the second direction is opposite to the first direction; and the sound waves emitted by the second main loudspeakers are transmitted to the first sound wave reflection face and can be reflected by the first sound wave reflection face;

wherein the plurality of main loudspeakers is arranged in a plurality of array layers, the plurality of array layers is arranged in sequence along the first direction, centers of sound-generating surfaces of the plurality of main loudspeakers in each of the plurality of array layers are arranged in an array in a plane parallel to the first sound wave reflection face;

wherein the sound-generating controlling method comprises:

acquiring video data and audio data of audio and video data to be output;

performing feature classification on the audio data corresponding to a target output image in the video data, and determining an audio object in the audio data;

performing sound-generating object recognition according to the target output image, and determining a sound-generating object corresponding to the audio object;

determining sound-generating position coordinates of the sound-generating object when the target output image is 3D displayed on the display device; and sending audio control information to the plurality of the main loudspeakers according to the sound-generating position coordinates, so that the positions of sound sources generated by the plurality of the main loudspeakers are located at the sound-generating position coordinates.

10. The sound-generating controlling method according to claim 9, wherein the determining sound-generating object position coordinates of the sound-generating object when the target output image is 3D displayed on the display device comprises:

determining a depth image of the target output image when the target output image is 3D displayed on the display device;

determining plane coordinates of the sound-generating object according to the target output image, and determining depth coordinates of the sound-generating object according to the depth image; and determining the sound-generating position coordinates according to the plane coordinates and the depth coordinates.

11. The sound-generating controlling method according to claim 10, wherein the target output image comprises a first view image and a second view image, the first view image and the second view image are images of different views of the same sound-generating object, and the determining a depth image of the target output image when the target output image is 3D displayed on the display device comprises:

determining a pixel point corresponding to each pixel point in the first view image on the second view image in the target output image, and calculating and obtaining parallax of each pixel point in the first view image;

calculating and obtaining the depth value of each pixel point in the first view image according to the parallax of each pixel point in the first view image and following formulas, so as to obtain the depth image corresponding to the first view image; and $$\frac{T-(x_1-x_r)}{Z-f}=\frac{T}{Z} \Rightarrow \frac{fT}{x_1-x_r}=\frac{fT}{d}=Z$$

presenting the depth image of the first view image as the depth image when the target output image is 3D displayed on the display device, wherein, in the above formula, Z is a depth value of any pixel point in a first view image, T represents a distance between optical axis centers $O_l$ and $O_r$ of a first camera and a second camera photographing the first view image and the second view image, $x_l$ is an abscissa of any pixel point in the first view image on a projection plane of the first camera, $x_r$ is an abscissa of a corresponding pixel point in the second view image on a projection plane of the second camera, f is a focal length of the first camera and the second camera, and $d=x_l-x_r$ is a parallax of any pixel point in the first view image.

12. The sound-generating controlling method according to claim 10, wherein the determining the position coordinates of the sound-generating object according to the plane coordinates and the depth coordinates comprises:

determining the 3D image coordinates of the sound-generating object according to the plane coordinates and the depth coordinates;

converting the coordinates of the 3D image into a coordinate system determined according to the display component, and determining the sound-generating position coordinates.

13. The sound-generating controlling method according to claim 9, wherein the performing feature classification on the audio data corresponding to the target output image in the video data, and determining an audio object in the audio data comprises:

analyzing the audio data to extract audio features in the audio data;

integrating the extracted audio features to establish a feature vector; and classifying and recognizing the integrated feature vector, and determining different audio objects in the audio data.

14. The sound-generating controlling method according to claim 9, wherein the determining a sound-generating object corresponding to the audio object comprises:

matching each frame of output images of the video data and the audio data according to time-domain information of sound generated by the audio object in the audio data and according to sound-generating action information of the sound-generating object in the target output image, and determining the sound-generating object corresponding to each audio object in the audio data in the target output image.

15. A sound-generating controlling device, applied to the display device according to claim 6, comprising:

a data acquisition circuit, which is used for acquiring video data and audio data of audio and video data to be output;

an audio classification circuit, used for performing feature classification on the audio data corresponding to a target output image in the video data and determining an audio object in the audio data;

a recognition circuit, used for performing sound-generating object recognition according to the target output image, and determining a sound-generating object corresponding to the audio object;

a coordinate determining circuit, used for determining sound-generating position coordinates of the sound-generating object when the target output image is 3D displayed on the display device; and an audio output circuit, used for sending audio control information to the plurality of the main loudspeakers according to the sound-generating position coordinates, so that the positions of sound sources generated by the plurality of the main loudspeakers are located at the sound-generating position coordinates.

16. A sound-generating controlling device, comprising a processor, a memory, and programs or commands stored on the memory and executable on the processor, when executed by the processor, the programs or the commands can be used to realize the sound-generating controlling method described in claim 9.

17. A computer-readable storage medium, which stores the programs or commands, when executed by the processor, the programs or the commands can be used to realize sound-generating controlling method described in claim 9.

* * * * *